United States Patent
Stoeger et al.

(10) Patent No.: US 9,800,160 B2
(45) Date of Patent: Oct. 24, 2017

(54) SWITCHED MODE POWER SUPPLY, INVERTER AND STRING MONITORING ASSEMBLY COMPRISING SAID TYPE OF SWITCHED MODE POWER SUPPLY

(71) Applicant: Fronius International GmbH, Pettenbach (AT)

(72) Inventors: Max Stoeger, Vorchdorf (AT); Hubert Bammer, Gruenau im Almtal (AT)

(73) Assignee: Fronius International GmbH, Pettenbach (AT)

( * ) Notice: Subject to any disclaimer, the term of this patent is extended or adjusted under 35 U.S.C. 154(b) by 372 days.

(21) Appl. No.: 14/407,597

(22) PCT Filed: Jun. 11, 2013

(86) PCT No.: PCT/AT2013/050117
§ 371 (c)(1),
(2) Date: Dec. 12, 2014

(87) PCT Pub. No.: WO2013/185159
PCT Pub. Date: Dec. 19, 2013

(65) Prior Publication Data
US 2015/0171755 A1 Jun. 18, 2015

(30) Foreign Application Priority Data
Jun. 13, 2012 (AT) ............... A 50231/2012

(51) Int. Cl.
*H02J 1/10* (2006.01)
*H02M 3/335* (2006.01)
(Continued)

(52) U.S. Cl.
CPC ......... *H02M 3/33507* (2013.01); *H02J 3/383* (2013.01); *H02M 3/3376* (2013.01);
(Continued)

(58) Field of Classification Search
USPC .......................................... 307/43
See application file for complete search history.

(56) References Cited

U.S. PATENT DOCUMENTS

| 5,455,758 A | 10/1995 | Pelly |
| 5,831,838 A | 11/1998 | Illingworth |

(Continued)

FOREIGN PATENT DOCUMENTS

| CN | 1808896 A | 7/2006 |
| CN | 101488715 A | 7/2009 |

(Continued)

OTHER PUBLICATIONS

International Search Report of PCT/AT2013/050117, dated Jul. 17, 2014.

(Continued)

*Primary Examiner* — Rexford Barnie
*Assistant Examiner* — Dru Parries
(74) *Attorney, Agent, or Firm* — Collard & Roe, P.C.

(57) ABSTRACT

The invention relates to a switched-mode power supply (14) for supplying the components of a photovoltaic system (1) with a constant DC output voltage ($U_a$), comprising connections (15) for connecting to the photovoltaic modules (2) of the photovoltaic system (1) for providing a DC input voltage ($U_e$), a DC/DC voltage converter (16) comprising at least one switch (17), a transformer (18), a control device (22) for controlling the at least one switch (17) at a switching frequency ($f_s$) for obtaining the desired DC output voltage ($U_a$), an output equalizing voltage (23) and connections (24) for providing the DC output voltage, as well as the inverter (4) and a string monitoring assembly (3) of a photovoltaic system (1). In order to obtain a DC output voltage ($U_a$) with the losses as low as possible for a very wide range of DC input voltages ($U_e$) between 200 V and 1500 V, the DC/DC (Continued)

voltage converter (16) is formed by a combination of flyback and forward converters having two serially arranged switches (17, 17'). Said switches (17, 17') are connected to the control device (22) which is designed such that the control of the DC output voltage ($U_a$) occurs such that the switches (17, 17') are switched in accordance with the flow on the primary side passing through the primary winding (20) of the transformer (18).

17 Claims, 6 Drawing Sheets

(51) Int. Cl.
    *H02M 3/337* (2006.01)
    *H02J 3/38* (2006.01)
    *H02M 7/537* (2006.01)

(52) U.S. Cl.
    CPC ....... *H02M 3/33546* (2013.01); *H02M 7/537* (2013.01); *Y02E 10/56* (2013.01); *Y10T 307/50* (2015.04)

(56) References Cited

U.S. PATENT DOCUMENTS

| | | | |
|---|---|---|---|
| 6,084,792 | A | 7/2000 | Chen et al. |
| 6,320,763 | B2 | 11/2001 | Hosotani |
| 6,487,092 | B2 | 11/2002 | Nishikawa |
| 7,245,087 | B2 | 7/2007 | Nishikawa et al. |
| 8,125,158 | B2 | 2/2012 | Nishino et al. |
| 8,310,281 | B2 | 11/2012 | Draxelmayr |
| 2006/0152199 | A1 | 7/2006 | Angquist |
| 2006/0239043 | A1 | 10/2006 | Ohbo |
| 2008/0291702 | A1 | 11/2008 | Hosotani |
| 2011/0050190 | A1 | 3/2011 | Avrutsky |
| 2012/0133398 | A1 | 5/2012 | Draxelmayr |

FOREIGN PATENT DOCUMENTS

| | | |
|---|---|---|
| CN | 101601182 A | 12/2009 |
| DE | 43 04 694 A1 | 8/1993 |
| DE | 101 23 518 A1 | 11/2001 |
| DE | 101 46 168 A1 | 4/2003 |
| DE | 10 2004 001 450 A1 | 8/2005 |
| DE | 10 2005 051 087 A1 | 5/2006 |
| DE | 601 20 800 T2 | 11/2006 |
| DE | 10 2011 087 431 A1 | 5/2012 |
| EP | 1 143 594 A2 | 10/2001 |
| EP | 2 309 632 A1 | 4/2011 |

OTHER PUBLICATIONS

Austrian Office Action in A 50231/2012-1, dated May 23, 2013, with English translation of relevant parts.
German Office Action dated Apr. 28, 2015 in DE 11 2013 002 982.0, with English translation of relevant parts.
Chinese Office Action in CN 201380040508.8, dated Nov. 1, 2016.
Chinese Office Action in CN 201380040508.8, dated Jun. 27, 2017.

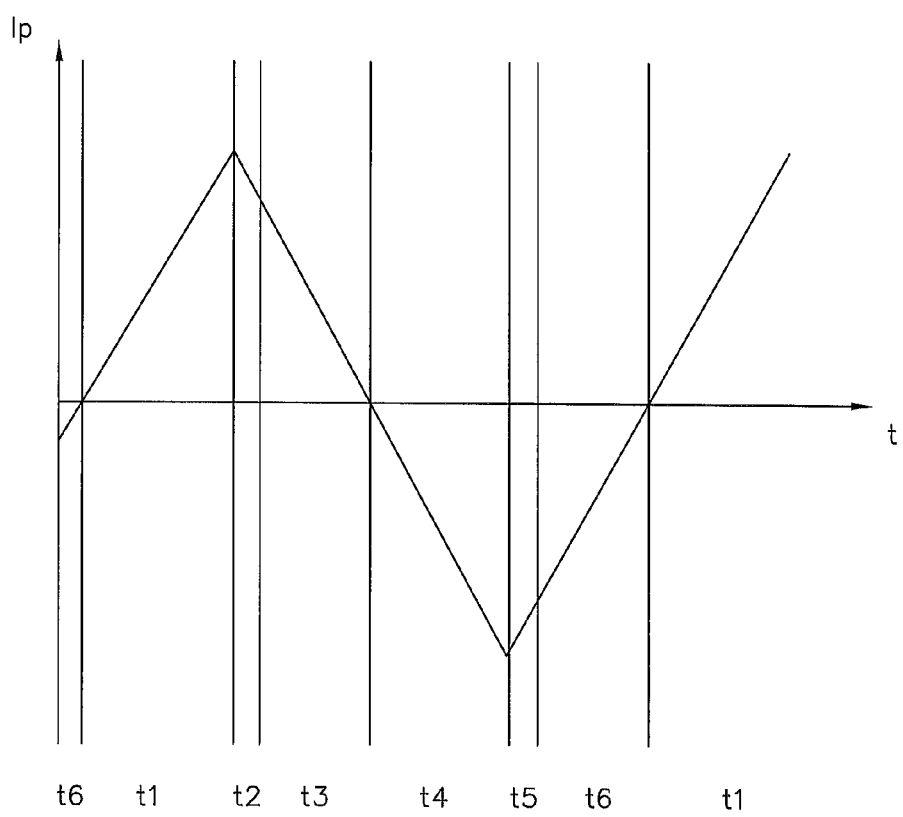

SWITCHED MODE POWER SUPPLY, INVERTER AND STRING MONITORING ASSEMBLY COMPRISING SAID TYPE OF SWITCHED MODE POWER SUPPLY

CROSS-REFERENCE TO RELATED APPLICATIONS

This application is the National Stage of PCT/AT2013/050117 filed on Jun. 11, 2013, which claims priority under 35 U.S.C. §119 of Austrian Application No. A 50231/2012 filed on Jun. 13, 2012, the disclosure of which is incorporated by reference. The international application under PCT article 21(2) was not published in English.

The invention relates to a switched-mode power supply for supplying the components of a photovoltaic system with a constant DC output voltage comprising connections for connecting to the photovoltaic modules of the photovoltaic system for providing a DC input voltage in the range between 200 V and 1500 V, a DC/DC voltage converter comprising at least one switch, a transformer having a coil bobbin, a primary winding and a secondary winding, a control device for controlling the at least one switch of the DC voltage converter at a switching frequency for obtaining the desired DC output voltage, an output equalizer and connections for providing the DC output voltage.

In addition, the invention relates to an inverter and a string monitoring assembly for a photovoltaic system with photovoltaic modules, comprising a power supply.

Photovoltaic systems serve to generate electric energy from light, in particular from sunlight and to feed it into the power supply system or to use it to operate electric loads. Photovoltaic modules are used for the generation of direct voltage from light energy. The DC voltage generated is converted to AC voltage by means of inverters. In recent times the trend has been to use a higher number of photovoltaic modules with correspondingly higher DC input voltages, ranging between the bottom low-voltage range of e.g. 200 V and the medium-voltage range of e.g. 1500 V. So-called string controllers are used for the management of a large number of photovoltaic modules which are switched in series and in parallel. For the future, it can be expected that the trend toward an even larger number of photovoltaic modules or even higher DC input voltages will be continuing.

To supply the electric components of the photovoltaic system, in particular the inverter and any string monitoring assembly, unless the latter is integrated in the inverter, normally circuits are used for the power supply, which generate from the direct voltage of the photovoltaic modules the direct voltage necessary for operating the electric components of the photovoltaic system. Conventional voltage supplies with a relatively good efficiency and relatively small losses have been employed for the application in previous photovoltaic systems with limited input voltage ranges. Due to the higher range of the DC input voltage for example between 200 V and 1500 V, however, with conventional technologies it is no longer possible to provide power supply circuits that show low losses and a relatively good efficiency at all possible input voltages, since in the case of such a high input voltage range the energy efficiency with switching losses is not satisfactory, and cooling of the switches turns out to be costly.

Known power supplies for components of grid-connected inverters work with flyback converter topologies, which have the disadvantage that higher voltages lead to ever higher switching losses and thus result in reduced energy efficiency. In the case of voltages close to the medium voltage or above it, any energy-efficient supply is no longer possible and the losses occurring in the switches can only be reduced at an increased amount of cooling, which in turn leads to an increase in the overall costs and a reduction of the entire efficiency.

In other solutions, the large DC input voltage range is divided into two or more ranges and a sufficient number of serial power supplies or switch-mode power supplies having a corresponding number of transformer windings is used. This, however, increases the complexity of switching and thus raises the costs.

DE 10 2011 087 431 A1 shows a control circuit for a cascade transformer, the circuit of which uses an opto-coupler. Further circuits for providing a power supply are known from DE 10 2004 001 450 A1, U.S. 2011/0050190 A1 and U.S. 2006/0152199 A.

EP 1 143 594 A2 describes a control circuit for a photovoltaic system, by means of which grounding faults may be detected.

The object of the invention is to provide a switched-mode power supply cited above and an inverter cited above or a string monitoring assembly cited above for a photovoltaic system, by which also at a relatively high DC input voltage range between 200 V and 1500 V, an efficient and low-loss supply of components of the photovoltaic system with electrical energy can be achieved. Disadvantages of the prior art are to be avoided or to be reduced at least.

The object according to the invention is solved by the switched-mode power supply cited above, wherein the DC voltage converter is formed by a combination of flyback and forward converters having two serially arranged switches, said switches being connected to the control device and the control device being designed such that the control of the DC output voltage occurs such that the switches are switched in accordance with the flow on the primary side through the primary winding of the transformer. The DC voltage converter, according to the invention, of the switched-mode power supply is formed by a combination of flyback and forward converters in a semi-bridge arrangement. In the switched-mode power supply of the invention the switches are designed such that the losses occurring are as low as possible, which leads to an increase in the efficiency of an inverter equipped with said switched-mode power supply. In addition, the control means of the switched-mode power supply of the invention is connected to the primary side of the transformer of the switched-mode power supply, so that the control of the output voltage can take place in accordance with the current flow on the primary side and not in accordance with the highly fluctuating input voltage. The switched-mode power supply according to the invention distinguishes itself by low losses and therefore a small size. Due to the small losses occurring in the switches of the switched-mode power supply, it is not necessary to mount any cooling elements for the cooling of the components of the switched-mode power supply or the inverter. In particular, the size of the transformer of the switched-mode power supply can be reduced considerably as compared with transformers used so far.

The switches are advantageously connected to the primary winding of the transformer.

To control the switch connected to the positive DC input voltage, i.e. the so-called high-side switch separately, the control device of the switched-mode power supply preferably contains an opto-coupler for controlling said high-side switch. Thus, the high-side switch of the switched-mode power supply is controlled via optoelectronic components.

In accordance with another feature of the invention the opto-coupler is supplied by a bootstrap circuit. Due to the use of such a bootstrap circuit for controlling the switches of the switched-mode power supply the high-side switch may stay switched on more than 50%.

The control device can be designed for the control of the switching frequency of the switch in accordance with the current flow on the primary side through the primary winding of the transformer. In such a case of control the switching frequency of the switches is changed with a constant current flow on the primary side to obtain a constant output voltage of the switched-mode power supply. Such a control is known as pulse frequency mode.

According to one variant of the switched-mode power supply, the control device is designed for controlling the on-time of a switch in accordance with the primary-side current flow through the primary winding of the transformer at a constant frequency. In this variant the pulse width, during which a switch is turned on, is controlled.

To meet the high requirements of insulation and construction of the transformer of the switched-mode power supply and to obtain a size of the transformer as small as possible, various measures turn out to be advantageous. For one thing, for reducing the parasitic capacities of the transformer it is of advantage that the connections of the primary winding and the connections of the secondary winding of the transformer are arranged on one side.

In addition, it is of advantage that the distance between the connections of the primary winding and the distance of the connections of the secondary winding of the transformer are selected as large as possible, since thus the highest possible potentials have the highest possible distance to each other.

Arranging an insulation tube above the connections of the primary winding of the transformer provides for sufficient clearance and creepage distances on the primary side of the transformer, which in turn has a positive effect on the size of the transformer. A silicone tube is particularly suited as insulation tube.

Forming the secondary winding of the transformer by means of an oppositely double-wrapped stranded wire, a fully insulated strand or a fully insulated wire can provide for improved insulation and increased clearance and creepage distances.

Another improvement may be obtained in that an insulation, in particular, a polyester film is arranged between the primary winding and the secondary winding of the transformer.

Furthermore, it is of advantage to arrange an insulation, in particular a polyester foil directly on the coil bobbin of the transformer.

Encapsulating the transformer in a suitable material may further improve the insulation and increase the clearance and creepage distances.

The switching frequency is advantageously between 18 kHz and 500 kHz, preferably 54 kHz. When using such high switching frequencies it is possible to keep the size of the transformer low.

The switches of the switched-mode power supply are preferably formed by transistors, in particular field effect transistors. In particular, low-ohmic high-voltage transistors such as silicon carbide MOS-FET or J-FET are particularly suited.

Arranging diodes and capacitors with corresponding dimensions in parallel with the switches of the switched-mode power supply can help obtain low-lost switching of the switches (zero voltage switching).

The object according to the invention is also solved by an inverter cited above for a photovoltaic system and a string monitoring assembly cited above for a photovoltaic system, in which the power supply is designed by a switched-mode power supply in accordance with the above description. By providing a particularly low-loss switched-mode power supply, which is capable of supplying a constant output voltage for the components of the photovoltaic system also with a very large input voltage of e.g. between 200 V and 1500 V, the former may also be integrated in the inverter or the string monitoring assembly. Due to this mode of operation of the switched-mode power supply, the losses in the transistors are so low that no cooling elements have to be mounted.

The present invention will be described with reference to the enclosed schematic drawings, in which:

FIG. 5 shows a schematic course of the current flow on the primary side through the transformer of the switched-mode power supply according to FIG. 4;

As an introduction, it is pointed out that like reference characters designate the same parts of the embodiment.

Figure 1:
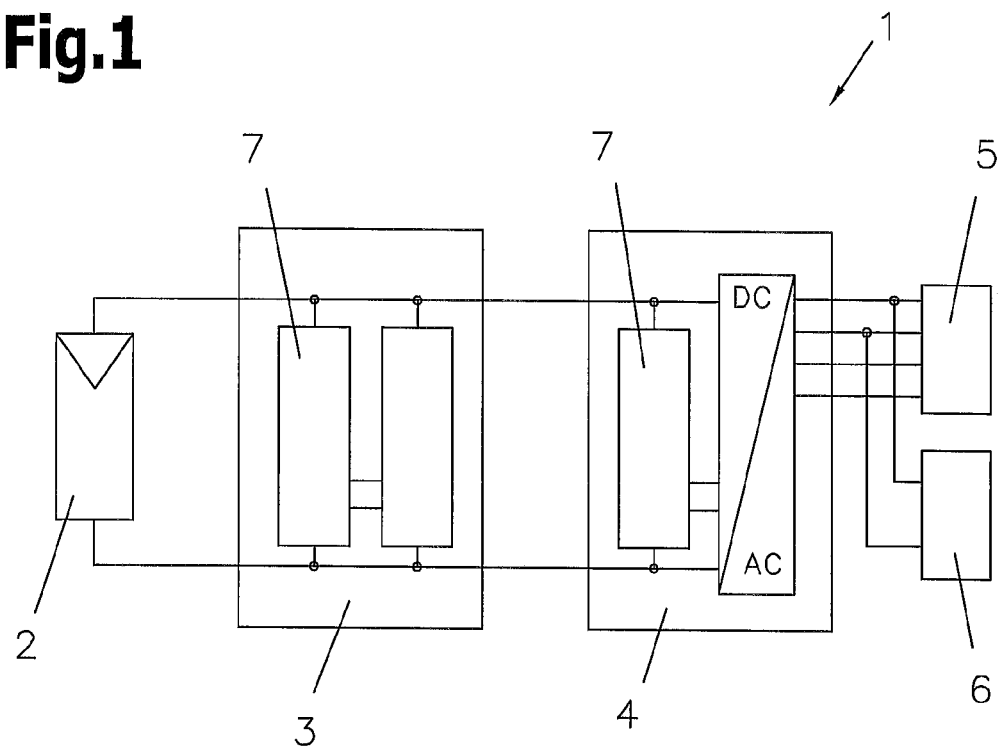
FIG. 1 shows a schematic block diagram of a photovoltaic system.

FIG. 1 shows a schematic block diagram of a known photovoltaic system 1. The photovoltaic modules 2 of the photovoltaic system 1 are usually connected to the inverter 4 via a string monitoring assembly 3 (string controller), which can also be integrated in an inverter 4. From the DC voltage of the photovoltaic modules 2 the inverter 4 generates a corresponding AC voltage which is supplied into the supply mains 5 and/or is used for the supply of corresponding electric loads 6. Usually, many photovoltaic modules 2 are connected in series and in parallel. The components of the photovoltaic system 1, in particular the string monitoring assembly 3 and the inverter 4 have to be supplied by corresponding voltage supplies 7 with the desired electric energy, preferably a DC voltage of 14 V. The inverter 4 and/or the string monitoring assembly 3 generate(s) an internal supply voltage for the electronic components or for the circuit design, wherein said voltage may also be carried to the outside via corresponding connection elements for additional connectable components. Therefore, the voltage required for the components of the photovoltaic system 1 is derived directly from the available DC voltage of the photovoltaic modules 2. In the case of a very large DC input voltage range or a very large number of photovoltaic modules 2 connected in series and the high voltage resulting therefrom, it is very difficult with conventional technologies on switched-mode power supplies to generate the DC voltage required for the components of the photovoltaic system 1 in a low-loss manner, i.e. with a relatively high degree of efficiency. The large DC input voltage range follows from the fact that solar radiation is changing in the course of the day, that is to say that after sunrise the photovoltaic modules 2 provide less energy than around noon. In addition, a larger DC input voltage range has the advantage of that the number of photovoltaic modules 2 connected in series and in parallel may be designed more flexibly.

Figure 2:
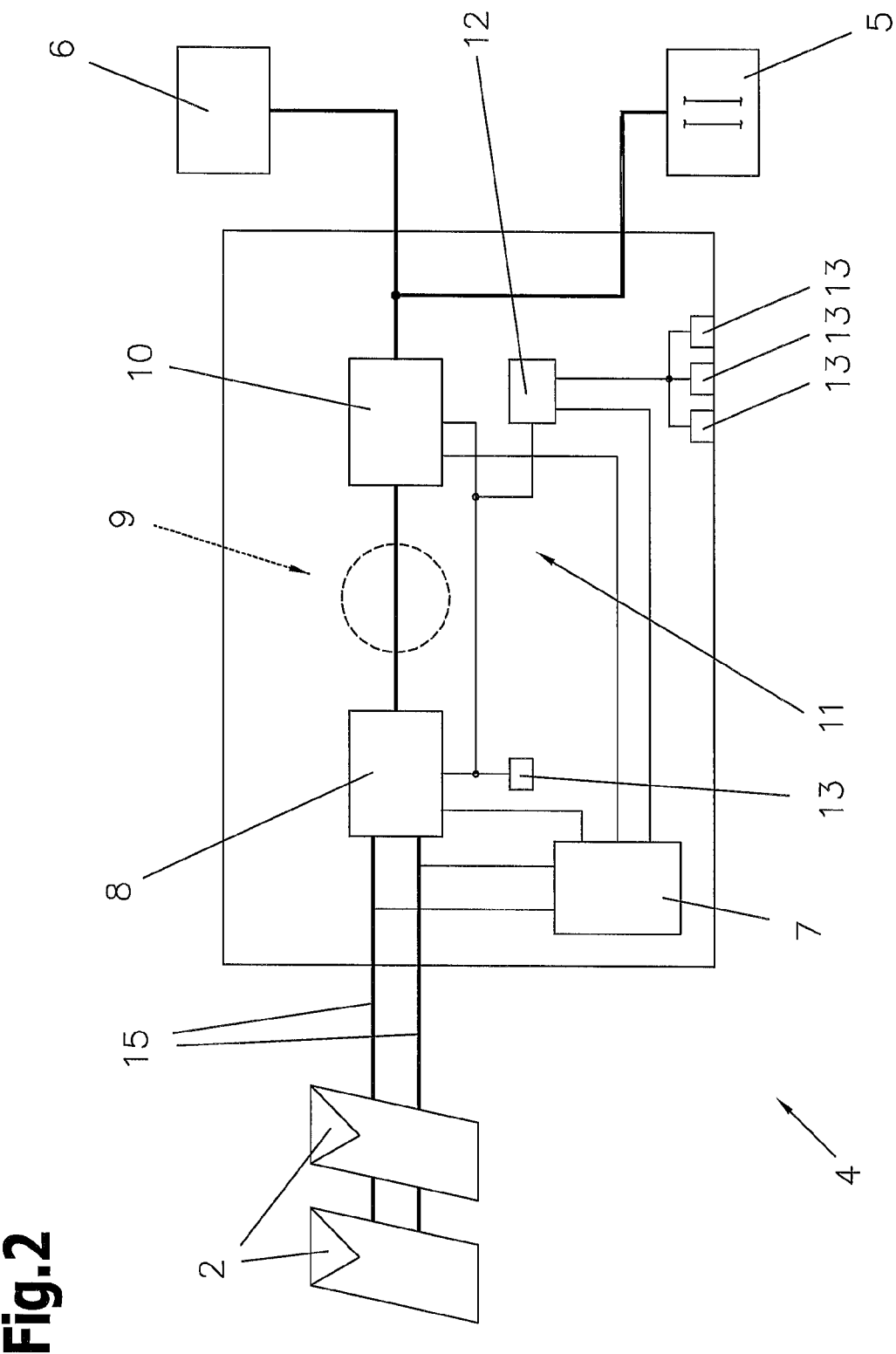
FIG. 2 shows a block diagram of an inverter of a photovoltaic system.

FIG. 2 shows the design of a known inverter 4, i.e. an HF inverter in detail. Since the individual components or assembly groups and functions of inverters 4 are known from the prior art already, they will not be dealt with below.

The inverter 4 comprises at least one DC/DC input converter 8, an intermediate circuit 9 and a DC/AC output converter 10. One or several photovoltaic modules 2 connected to each other in series and/or in parallel are connected to the DC/DC input converter 8. The output of the inverter 4 or the DC/AC output converter 10 can be connected to a supply mains 5, such as a public or private AC grid or a multi-phase grid, and/or to at least one electric load 6. An electric load 6, for example, includes a motor, refrigerator, radio set, household appliance etc. Likewise the electric load 6 can also be the power supply for a building. The individual components of the inverter 4 can be connected to a control device 12 via a data bus 11.

Such an inverter 4 preferably serves as a so-called grid-connected inverter 4, whose energy management is optimized so as to supply as much energy as possible to the supply mains 5. As is known from the prior art the electric load 6 is supplied with power via the supply mains 5. Of course, also several inverters 4 connected in parallel can be used. Thus, more energy can be provided to operate the electric load 6.

This energy is supplied by the photovoltaic modules 2 in the form of DC voltage, which modules are connected to the inverter 4 by at least two connections 15.

The control device 12 of the inverter 4, for example, is formed by a microprocessor, microcontroller or computer. The individual components of the inverter 4, such as the DC/DC input converter 8 or the DC/AC output converter 19, in particular the switching elements contained therein can be controlled via the control device 12. For this purpose, the individual control processes are stored by corresponding software programmes and/or data or characteristic curves in the control device 12.

Furthermore, operating elements 13 are connected to the control device 12, by which the user can configurate e.g. the inverter 4 and/or indicate (e.g. by means of light-emitting diodes) the operating states or parameters and adjust them. The operating elements 13, for instance, are connected to the control device 12 via the data bus 11 or directly connected to it. The operating elements 13, for example, are arranged on a front of the inverter 4, so that operation thereof is possible from outside. Likewise the operating elements 13 can also be arranged directly on assembly groups and/or modules within the inverter 4.

Figure 3:
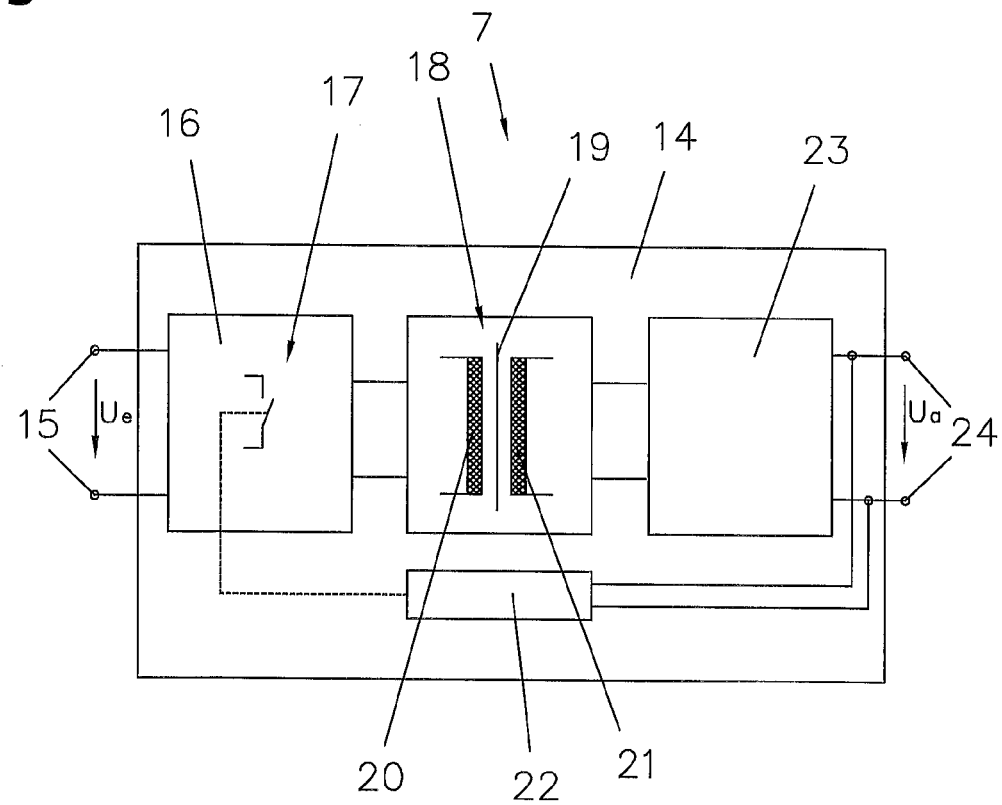
FIG. 3 shows a block diagram of a switched-mode power supply for supplying the components of a photovoltaic system.

FIG. 3 shows a block diagram of a switched-mode power supply 14 for the inverter 4 and/or the string monitoring assembly 3 or other components of a photovoltaic system 1 for the formation of a constant DC output voltage $U_a$ from a DC input voltage $U_e$ in a relatively large range between approximately 200 V and 1500 V. The switched-mode power supply 14 is connected to the photovoltaic modules 2 (not shown) via two connections 15. The photovoltaic modules 2 supply a DC input voltage $U_e$ which exists in a very large range between e.g. 200 V and 1500 V. In a DC voltage converter 16 the DC input voltage $U_e$ is converted to AC voltage by means of at least one switch 17 and supplied to a transformer 18. The transformer 18 consists of a coil bobbin 19, a primary winding 20 and at least one secondary winding 21. In an output rectifier 23 the transformed voltage signal is rectified and fed to the connections 24 for tapping the DC output voltage $U_a$. The components of the photovoltaic system 1 are supplied with this DC output voltage $U_a$. The at least one switch 17 of the DC voltage converter 16 is triggered via the control device 22 such that a constant output DC voltage $U_a$ can be obtained also in the case of different or fluctuating DC input voltages $U_e$. In this connection, the DC voltage converter 16 of the switched-mode power supply 14 is preferably formed by a combination of flyback and forward converters including two switches 17, 17' connected in series, wherein the control device 22 is connected to the primary winding 20 of the transformer 18 in particular via the switches 17, 17'. Likewise, the control device 22 detects the output voltage $U_a$ via the connections 24, which is kept constant at the desired height. For this purpose, the switches 17, 17' are connected in accordance with the output voltage $U_a$, so that the current flow through the primary winding 20 of the transformer 18 will be adapted.

Figure 4:
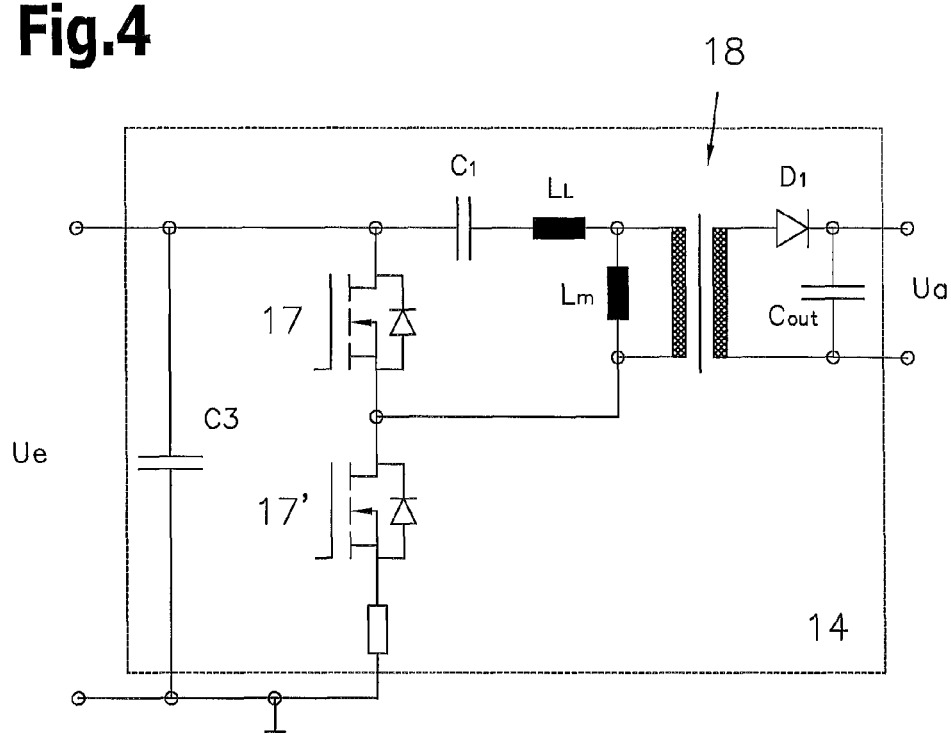
FIG. 4 shows an embodiment of a switched-mode power supply for supplying the components of a photovoltaic system.

FIG. 4 shows a preferred embodiment of a switched-mode power supply 14 for the supply of components of a photovoltaic system 1, in particular for the use in an inverter 4 and/or a string monitoring assembly 3, in which the DC voltage converter 16 is formed by combining a flyback and forward converter in a semi-bridge arrangement with two switches 17, 17' connected in series (one so-called high-side switch 17 connected to the positive pole of the DC input voltage and one so-called low-side switch 17' connected to the mass). So to say, the circuit is an asymmetric duty cycle flyback converter, whose operating principle will be described in the following by way of consulting the time diagram of the current flow on the primary side of the transformer according to FIG. 5.

During the time interval $t_1$ the switch 17' of the so-called low-side switch 17' or the low-side transistor, respectively, is switched on, and both the magnetizing inductivity $L_m$ and the leakage inductance $L_L$ of the transformer 18 and the capacitor C1 connected in series are charged with energy. Accordingly, the current increases in the time interval $t_1$, with no energy being transmitted on the secondary side of the transformer 18. Here, the capacitor C3 is charged and the switch 17 is turned off. During the time interval $t_2$ the low-side switch 17' is turned off. The current commutes in the parallel parasitic or additional capacitor C2, which will be charged. Thus, no turn-off loss occurs, since the switch 17' is zero-potential. Now the capacitor C2 is charged up until the input voltage $U_e$, while the capacitor C3, which is arranged in parallel to the high-side switch 17 or the high-side transistor, respectively, is discharged. That is to say that C2 and C3 switched in reverse fashion. For such reverse charging the inductivities $L_m$ and $L_L$ are discharged and the capacitor C1 is charged, wherein the polarity of the transformer 18 changes on the primary side and on the secondary side. Thus, in this step energy can be transmitted onto the secondary side. The duration of the reverse charging process is dependent on the dimensions of the capacitors C2 and C3 and on the choice of switches, respectively; in general, however, it is very short as compared to the charging and discharging processes of C1.

During the time $t_3$ the capacitor C2 is already completely discharged and the current of the inductivities $L_m$ and $L_L$ flows through the body diode or a serially connected diode of the high-side switch 17, respectively. The high-side switch 17 can now be turned on in a zero-potential and thus low-loss manner. In this connection, an electric circuit including switch 17, capacitor C1 and transformer 18 is formed. The current of $L_m$ is transmitted onto the secondary side (flyback converter operation) and the current of $L_L$ charges C1. In accordance with a lock mode, here the transformer acts as a choke. The moment when the switch 17 is turned on can be found out by means of voltage metering on the switch 17—in which connection a value close to zero or the diode voltage, respectively must be measured or a fixed dead time must be given, during which the capacities C2 and 3 are safely recharged. Accordingly, said moment is determined by the control device 22. It is essential thereby that the switch 17 is turned on during time $t_3$—essentially also possible at any time—so that energy is transmitted. For this purpose, the current continues to flow in the same direction.

Due to the energy transmission, the current on the primary side drops until the voltage on the capacitor C1 is larger than the voltage on the secondary side of the transformer 18, multiplied by the turns ratio of the transformer 18, and the entire primary leakage inductance $L_L$ in the transformer 18 is discharged or transmitted, respectively.

Subsequently, the current flowing through the primary winding 20 of the transformer 18 changes its polarity and the energy from the capacitor C1 is transmitted via the transformer 18 in the flow mode (forward converter) during time $t_4$. This occurs in addition to the lock mode, since the switch 17' is turned off. A precondition for this is that the voltage on the capacitor C1 is larger than the voltage $U_a$ on the secondary side of the transformer 18, multiplied by the turns ratio ü of the transformer 18. That is to say, energy is transmitted until C1 and $U_a$*ü become equal.

The time until the capacitor C1 has been discharged to the cited voltage $U_a$*ü is determined by the resonance formula $t=pi*\sqrt{(L_L*C1)}$. If this time is longer than $t_4$, the the DC voltage converter 16 is operated in uninterrupted manner. If the time is shorter, C1 is discharged completely up to $U_a$*ü (which corresponds to the so-called interrupted operation of the DC converter 16) and the time remaining until switchover is used to reverse the magnetization of the inductivity $L_m$. This constitutes an advantage for the case of higher voltages according to the present invention, since then more energy is available during the reverse charging process during $t_5$.

During time $t_5$ the high-side switch 17 is turned off in a free-of-loss manner, since the capacitor C3 is discharged since time $t_2$. This is due to the fact that the current commutes into the capacitor C3. Any subsequent turning on of the switch 17' requires to charge the capacitor C3 and discharge the capacitor C2. This is done substantially automatically by turning off the switch 17. Subsequently, the switch 17' can be turned on by the control device 22 in a free-of-loss manner. In the uninterrupted operation only the primary leakage inductance $L_L$ and, in a negligible manner, the magnetization inductivity $L_m$ drives the current and charges the capacitor C3 and discharges the capacitor C2. In the interrupted operation the amount of magnetization inductivity $L_m$ is involved to a much greater degree. Hence, during the short time $t_5$, the capacitors C2 and C3 are charged in reverse manner equivalently to time $t_2$.

A corresponding amount of energy is required for the reverse charging process.

At the beginning of time $t_6$ the capacitor C2 is discharged almost completely and the body diode of the low-side switch 17' or a parallel diode carries the current. The low-side switch 17' can thus be turned on in a nearly zero-potential and thus low-loss manner. The moment when the switch 17' can be turned on in a low-loss manner may be determined by means of voltage metering on the switch 17' or by a fixed time during which the capacitor C2 will be discharged safely. Accordingly, turning on of the switch 17' occurs equivalently to turning on of switch 17 in time $t_3$.

This course is repeated in accordance with a switching frequency in the range between 18 kHz and 500 kHz, in particular 54 kHz. In summary, in can be said that during time $t_3$ energy is transmitted in the lock mode and during time $t_4$ energy is transmitted in the flow mode and the lock mode. Correspondingly, flyback and forward converters are combined. The desired output voltage $U_a$ of the switched-mode power supply, for example, 5 V, 12 V, 24 V etc. results from this.

Triggering of the high-side switch 17 is not so trivial in this case, since said switch is turned on more than 50% (from time $t_3$ to time $t_4$). In the case of higher voltages or in the case of a possible soft start, it is turned on even up to 90% and even more. Therefore, triggering by means of a magnetic transformer is not expedient, since the demagnetization of the transformer calls for relatively high voltages. For this reason, an optical triggering with auxiliary power supply is preferred for this purpose, which can be realized by either an auxiliary switched-mode power supply or a bootstrap circuit.

Figure 6:
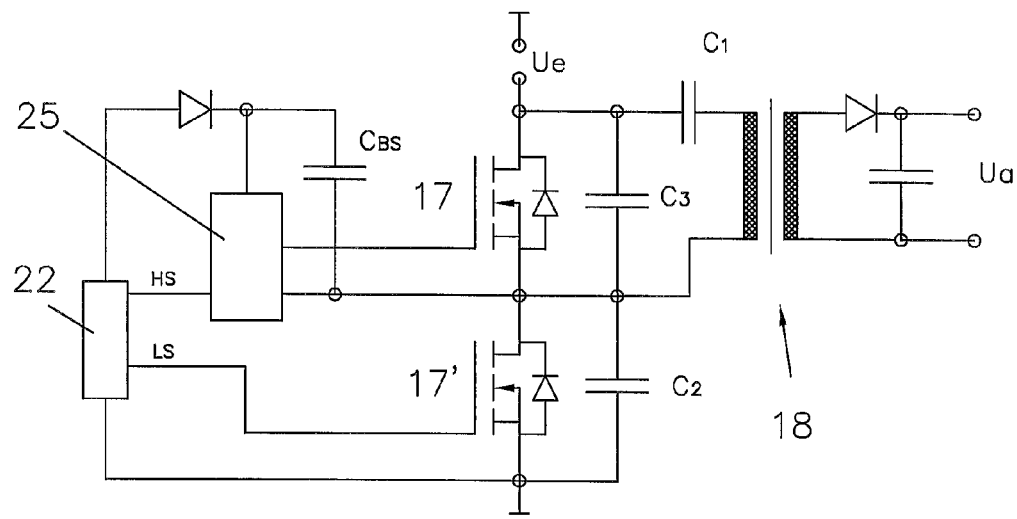
FIG. 6 shows an embodiment of the driver for the high-side switch of the switched-mode power supply according to FIG. 4.

FIG. 6 shows a variant of triggering the high-side switch 17 of the DC voltage converter 16 of the switched-mode power supply 14 with a bootstrap circuit. The high-side switch 17 is turned on with energy from the bootstrap capacitor $C_{BS}$. The latter is charged whenever the low-side switch 17' is turned on. In the case of very short switch-on periods, such as is the case above all with high voltages, any charging must be effected in a very short period of time. Insulated-gate bipolar transistors (IGBT) are not suited for this as switches 17, 17', since the saturation voltage is reached relatively late, for which reason the bootstrap capacitor $C_{BS}$ is not completely charged and the voltage is not sufficient to trigger the high-side switch 17. Low-ohmic MOS FETs or J-FETs, for example, on the basis of silicon carbide, are better suited for this purpose. Here, the time required for charging the bootstrap capacitor $C_{BS}$ can easily be calculated with the resistance $R_{Dson}$ of the low-side switch 17', with $t=R_{DSon}*C_{BS}$ and $U_{CBS}=U_q*(1-e^{(-t/T)})$, wherein $U_q$ in this case is 15 V minus the forward bias of the diode. In this connection, the 15 V correspond to the the supply voltage of the control device 22 for generating the high-side signal HS and the low-side signal LS. For obtaining an insulation as against the ground potential the triggering of the switch 17 is formed by an opto-coupler 25, since switch 17 does not have a ground potential.

Figure 7:
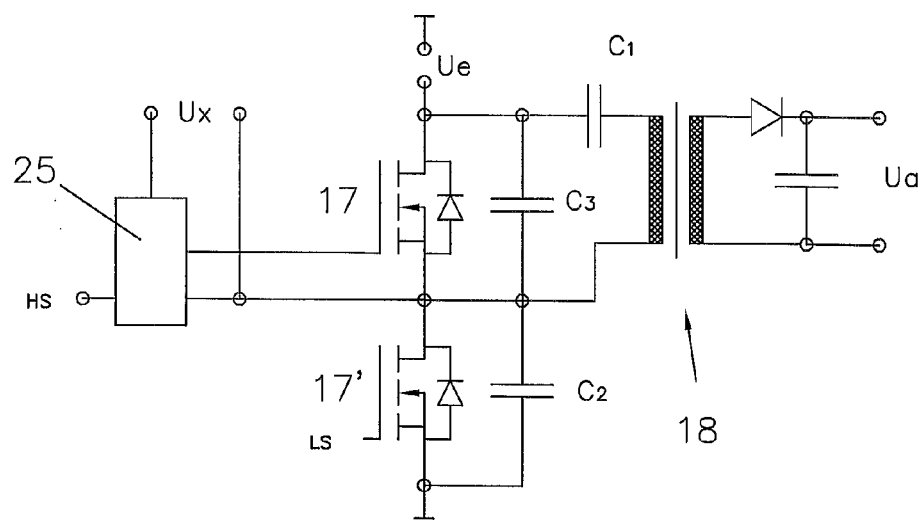
FIG. 7 shows another embodiment of a driver for the high-side switch of the switched-mode power supply according to FIG. 4.

FIG. 7 shows a variant of triggering the switch 17 with an auxiliary power supply $U_x$, which is supplied e.g. by a battery or an auxiliary switched-mode power supply.

Figure 8:
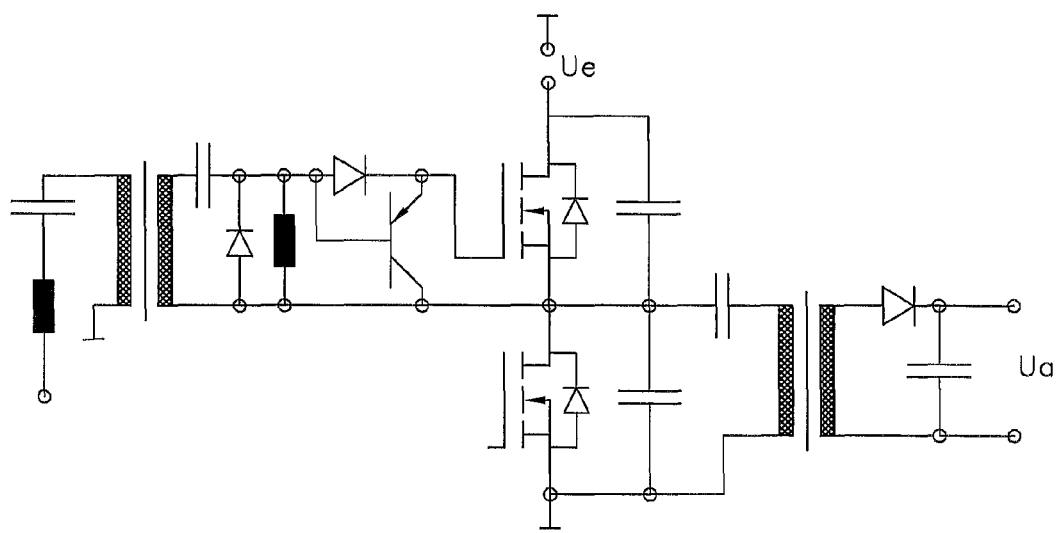
FIG. 8 shows another embodiment of a driver for the high-side switch of the switched-mode power supply according to FIG. 4.

Another possibility of such a safe triggering is to modify the topology such that the high-side switch 17 does not reach more than 50% of the switch-on time. Then, for triggering the high-side switch 17, one may resort to magnetic couplers 27 known from the prior art (cf. FIG. 8). For this purpose, the switches are swapped according to the functional description of FIGS. 2 to 7. Thus, switch 17' takes over the function of switch 17, i.e. has a reference to ground and can be triggered directly by the control device 22. The result of this is that the on-time is no longer relevant and the magnetic coupler 27 can be accordingly used.

One control option by means of the control device 22 of the output voltage $U_a$ consists in the control of time $t_1$ at a constant switching frequency $f_s$. Basically the control can occur by way of two known modes. In the "current mode" the current amplitude during $t_1$ is controlled in dependence on the output voltage $U_a$. Upon start-up, when the secondary capacitor is still discharged, the primary current is slowly increased until the output voltage $U_a$ has been reached. The advantage of such a control primarily lies in that in the very start-up no large primary excess currents are generated, as compared to the "voltage mode". In the "voltage mode" the pulse width is controlled during $t_1$. During start-up it diverges step by step. This is disadvantageous in that in the case of even lower secondary voltage the energy stored in the transformer 18 cannot be discharged fast enough, and a major portion of the energy remains in the transformer 18. Thus, during the next period, the primary current starts at nearly the value at which it had been turned off during the last period. Thus, the current continues to increase and there exists the danger of that the transformer 18 is saturated. A corrective measure may be current limiting, which turns off the switch 17, which is conductive during $t_1$, upon reaching a defined current and goes over into the "current mode".

Another option is the control of the frequency $f_s$ with constant time $t_1$. This is known as "pulse frequency mode". In this connection, $t_4$ is prolonged with the load being reduced, so that the number of energy transmissions drops. At the same time, the capacitor C1 connected in series to the transformer 18 is discharged to a lower level, and more reactive power is required to transmit energy.

In the case of high voltages, the requirements made to the insulations and the construction of the transformer 1 are very high. For one thing, the energy required for reversing is directly proportional to the parallel parasitic capacity of the transformer 18.

To keep the capacity-related influences as low as possible, the transformer 18 is designed such that a winding can always be fully wrapped in one layer. Alternatively, an uneven number of layers can also be used for the winding. This guarantees that the highest possible potentials are spaced apart from each other at a maximum distance. In addition, attention has been paid to the fact that the beginning of the winding and the end of the winding are spaced apart at a large distance, too. This principle is applied to both the primary winding 20 and the secondary winding 21.

The constant loads as a result of the high input voltage $U_e$ of e.g. 1500 V constitute very high demands on the insulation of the transformer 18.

For this purpose, the connections of the primary winding 20 and the secondary winding 21 are arranged on the same pin row, due to the capacitive optimization measures. Attention must be paid to the fact that those connections that are located directly in the separating path between the primary winding 20 and the secondary winding 21 are pulled out of the coil bobbin 19. Of course, the distance between the connections must be dimensioned big enough.

A silicone tube 26 is preferably arranged on the connections of the primary winding 20, so as to provide for sufficient clearance and creepage distances. On the secondary side as well as on the primary side an oppositely double-wrapped stranded wire is used. Due to this oppositely double-wrapped stranded wire, in the case of a 50% film overlapping, a clearance and creepage distance of 1.5 times the insulating film width is obtained. Alternatively, a fully insulated branded wire or a fully insulated wire can also be used. In addition, a lateral distance between the sidewall of the coil bobbin 19 and the windings 20, 21 is kept. A sufficiently thick layer of polyester film is inserted between the primary winding 20 and the secondary winding 21, since said film is the direct separating point. Preferably, also a layer of polyester film is directly wrapped on the coil bobbin 19, since polyester has a higher electric strength than the material of the coil bobbin 19. The silicone tubes 26, which are slipped on the connections of the primary winding 20, must reach up until the pin contact, since otherwise the clearance and creepage distances might be reduced via the ferrite core. Finally, a fully encapsulated transformer 18 is recommended. Even on a transformer 18 of a switched-mode power supply 14 with very low dimensions, the clearance and creepage distances can be extended by means of these measures so as to permanently ensure operation at high input voltages $U_e$.

Figure 9:
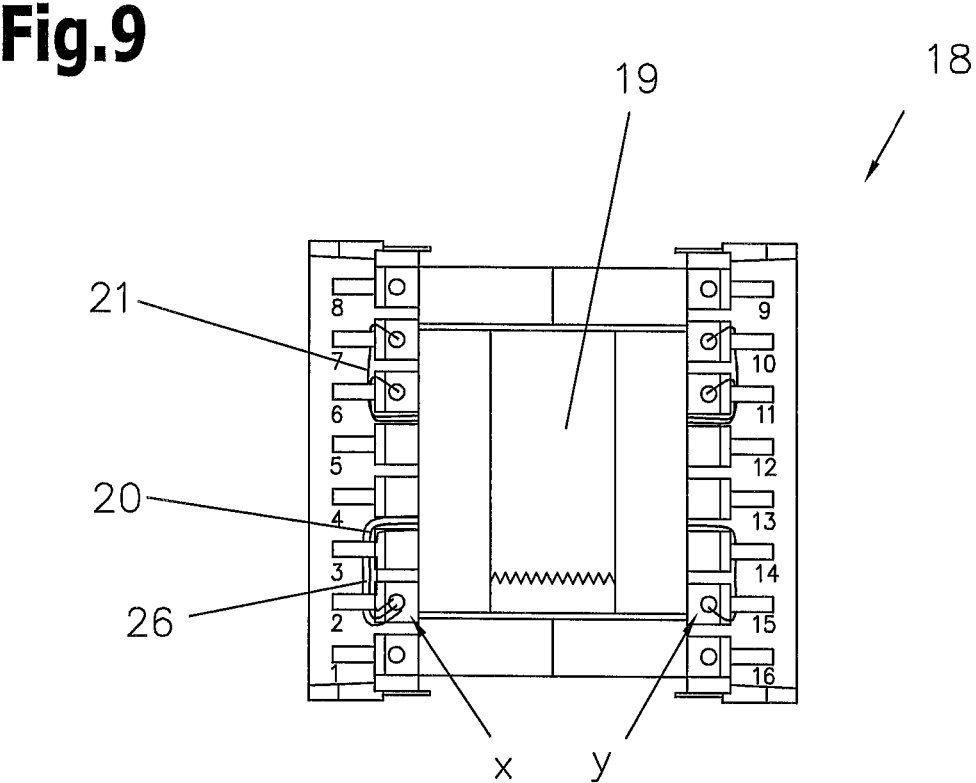
FIG. 9 shows a front view of a transformer of a switched-mode power supply for supplying the components of a photovoltaic system.
Figure 10:
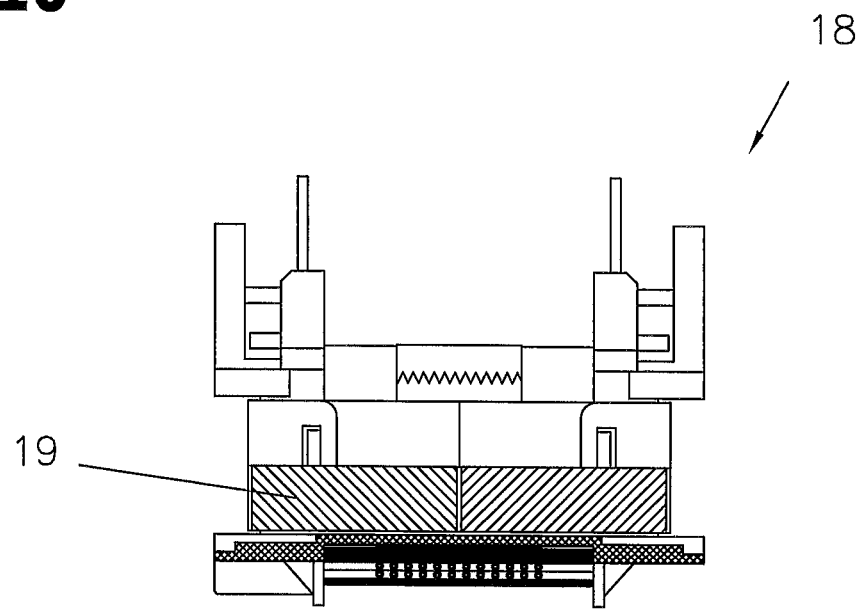
FIG. 10 shows a sectional view of the transformer of a switched-mode power supply according to FIG. 9.

The shown drawings according to FIGS. 9 and 10 of a transformer 18 represent only one embodiment.

The invention claimed is:

1. A switched-mode power supply for supplying the components of a photovoltaic system with a constant DC output voltage comprising connections for connecting to the photovoltaic modules of the photovoltaic system for providing a DC input voltage in the range between 200V and 1500V, comprising a DC/DC voltage converter comprising at least one switch, a transformer having a coil bobbin, a primary winding and a secondary winding, a control device for controlling the at least one switch of the DC/DC voltage converter at a switching frequency for obtaining the desired DC output voltage, an output rectifier and connections for providing the DC output voltage, wherein the DC/DC voltage converter is formed by a combination of flyback and forward converters having two switches arranged serially and formed by transistors in semi-bridge arrangement, wherein the two switches comprise one high side switch being connected to the positive pole of the DC input voltage and one low side switch being connected to ground, wherein the switches are connected to the control device and a capacitor connected in series with the primary winding of the transformer, wherein an additional capacitor is connected parallel to the low side switch, and the control device is designed such that the control of the output voltage occurs such that the switches are switched in accordance with the flow on the primary side passing through the primary winding of the transformer.

2. The switched-mode power supply according to claim 1, wherein the control device comprises an opto-coupler for controlling the high side switch.

3. The switched-mode power supply according to claim 2, wherein the opto-coupler is supplied by a bootstrap switch.

4. The switched-mode power supply according to claim 1, wherein the control device is designed for controlling the switching frequency of the switches in accordance with the primary-side current flow through the primary winding of the transformer.

5. The switched-mode power supply according to claim 1, wherein the control device is designed for controlling the on-time of a switch in accordance with the primary-side current flow through the primary winding of the transformer.

6. The switched-mode power supply according to claim 1, wherein the connections of the primary winding and the connections of the secondary winding of the transformer are arranged on one side.

7. The switched-mode power supply according to claim 1, wherein the distance between the connections of the primary winding and the distance of the connections of the secondary winding of the transformer are selected as large as possible.

8. The switched-mode power supply according to claim 1, wherein an insulation tube is arranged above the connections of the primary winding.

9. The switched-mode power supply according to claim 1, wherein the secondary winding is formed by an oppositely double-wrapped stranded wire or a fully insulated wire.

10. The switched-mode power supply according to claim 1, wherein an insulation is arranged between the primary winding and the secondary winding of the transformer.

11. The switched-mode power supply according to claim 1, wherein an insulation is arranged on the coil bobbin of the transformer.

12. The switched-mode power supply according to claim 1, wherein the transformer is encapsulated.

13. The switched-mode power supply according to claim 1, wherein the switching frequency is between 18 kHz and 500 kHz.

14. The switched-mode power supply according to claim 1, wherein the switches are formed by field effect transistors.

15. The switched-mode power supply according to claim 1, wherein diodes and capacitors are arranged in parallel to the switches.

16. An inverter for a photovoltaic system comprising photovoltaic modules, comprising a power supply, wherein the power supply is formed by a switched-mode power supply according to claim 1.

17. A string monitoring assembly for a photovoltaic system comprising photovoltaic modules, comprising a power supply, wherein the power supply is formed by a switched-mode power supply according to claim 1.

* * * * *